No. 788,034. Patented April 25, 1905.

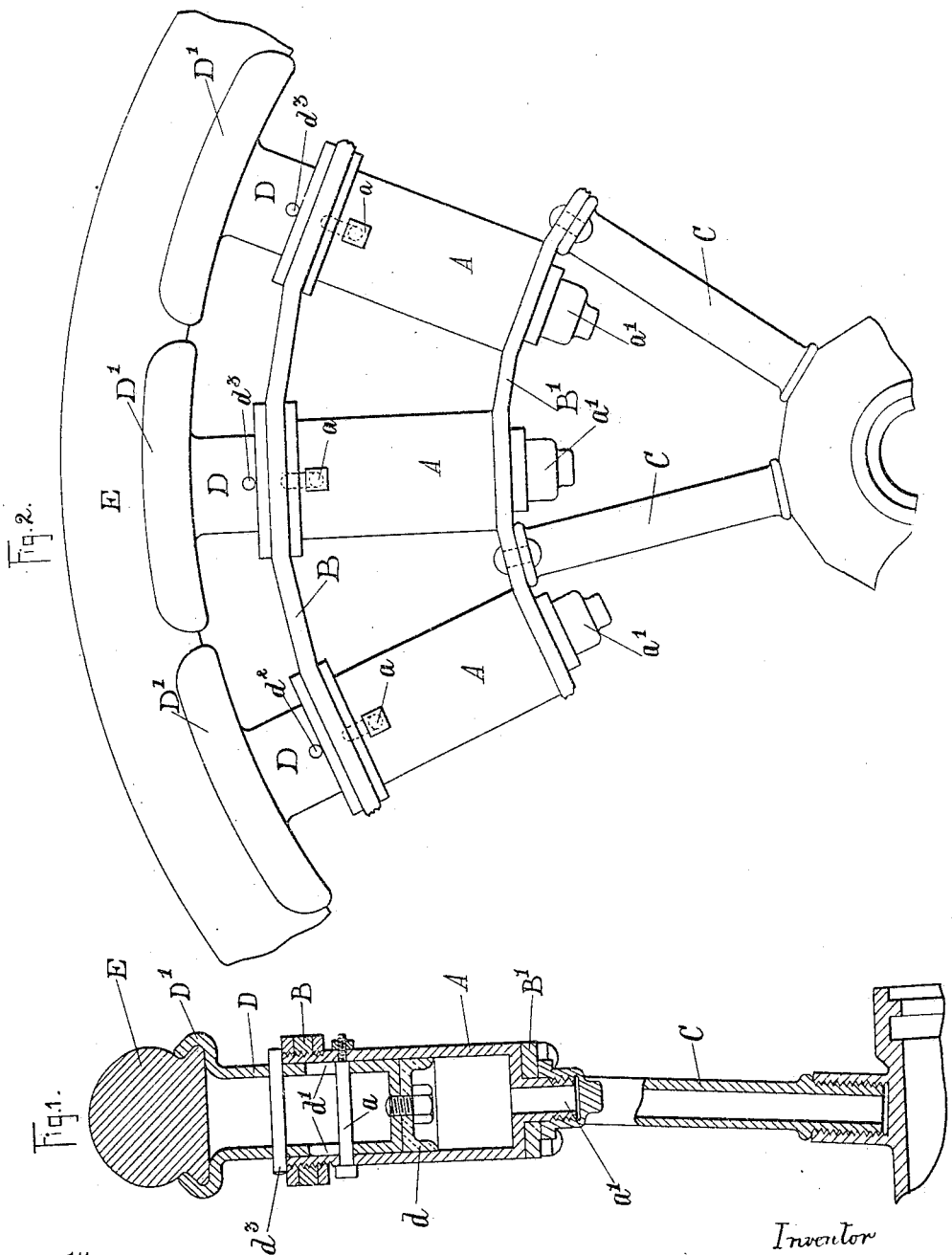

UNITED STATES PATENT OFFICE.

WILLIAM ROBERT FASEY, OF SNARESBROOK, ENGLAND.

VEHICLE-WHEEL.

SPECIFICATION forming part of Letters Patent No. 788,034, dated April 25, 1905.

Application filed August 29, 1904. Serial No. 222,602.

*To all whom it may concern:*

Be it known that I, WILLIAM ROBERT FASEY, a subject of the King of Great Britain and Ireland, and a resident of The Oaks, Holly Bush Hill, Snaresbrook, in the county of Essex, England, have invented certain new and useful Improvements in the Construction of Wheels for Motor and other Vehicles, of which the following is a specification.

This invention relates to improvements in the construction of wheels, more especially intended for use on motor-vehicles, and provides a wheel which gives resiliency and strength without necessitating the use of pneumatic tires.

I employ a number of radial cylinders, within which are plungers free to move against resilient pressure and carrying a rim and tire which possess resiliency, due to the cushion formed by the cylinder and plunger. The cylinders themselves are carried by a fixed rim and are charged with compressed air through a valve.

In order that this invention may be more readily understood, reference is had to the accompanying sheet of drawings, in which—

Figure 1 is a section through part of a wheel constructed according to my invention, and Fig. 2 is an elevation of part of the wheel.

A A are the radial cylinders, which in the construction shown are carried between the two fixed rims B and B', the spokes C being riveted or otherwise fixed to the inner rim B'. Within the cylinders the plungers D move, an air-tight joint being provided by the cup-leather $d$. The outer ends of the plungers form the rim-sections D', carrying the rubber or other tire E, this arrangement allowing each part of the rim D' to move independently. The plunger D is slotted at $d'$, and through this slot there passes a pin $a$, carried by the cylinder, this pin limiting the motion of the plunger and preventing its leaving the cylinder. The plunger is also perforated at $d^2$, and a locking-pin $d^3$ may be passed through this hole in cases of emergency, preventing any particular plunger moving toward the center of the wheel. This arrangement is only for use in case a cylinder should be injured or leak, so that the air-pressure cannot be maintained in it. A valve of any suitable construction is fitted in the inner end $a'$ on each cylinder, enabling it to be pumped up to any required pressure.

It will be seen that without the necessity of employing a pneumatic tire a wheel constructed according to my invention possesses great resiliency, due to the fact that each part of the tire and tire-rim is supported by resilient means retaining the advantages of a pneumatic tire without the danger of puncturing.

To reduce the cost of my improved wheel as far as possible, I may make the body of the wheel from stampings, both sides being identical, and bolt the stampings together to form the air-chambers and cylinders instead of making separate cylinders and screwing or bolting them to the rim.

I have described the apparatus as entirely pneumatic in its construction, but the necessary resiliency may be supplied by other means.

What I claim as my invention, and desire to secure by Letters Patent, is—

1. In a wheel for motor and other vehicles, fixed rims secured to the spokes, radial cylinders carried by the fixed rims having valves for the supply of compressed air, plungers within the cylinders supported by the air-cushion, and an outer rim and tire upon the ends of the plungers, substantially as herein described.

2. In a wheel for motor and other vehicles the combination of rims B and B' to the inner of which the spokes C are secured, radial cylinders A between the said rims, valves at the inner ends of the cylinders for the supply of compressed air, outer rim-sections D' on the ends of the plungers and tire E carried by the rim-sections D', substantially as herein described.

In witness whereof I have hereunto set my hand in the presence of two witnesses.

WILLIAM ROBERT FASEY.

Witnesses:
 FRANK WILLIAM PATHOON,
 RICHARD WESTACOTT.